United States Patent [19]
Uemura

[11] Patent Number: 4,792,971
[45] Date of Patent: Dec. 20, 1988

[54] SELECTIVE VIEWING CONTROL SYSTEM FOR CATV

[75] Inventor: Hiroki Uemura, Tokyo, Japan

[73] Assignee: Pioneer Electronic Corporation, Tokyo, Japan

[21] Appl. No.: 122,644

[22] Filed: Nov. 13, 1987

Related U.S. Application Data

[63] Continuation of Ser. No. 736,058, May 20, 1985, abandoned.

[30] Foreign Application Priority Data

May 18, 1984 [JP] Japan .................... 59-101609

[51] Int. Cl.⁴ .................... H04N 7/167; H04N 7/10
[52] U.S. Cl. .................... 380/7; 358/86; 380/20
[58] Field of Search .................... 380/6–8, 380/10, 20; 358/86

[56] References Cited

U.S. PATENT DOCUMENTS

| | | | |
|---|---|---|---|
| 4,148,064 | 4/1976 | Reed | 358/118 |
| 4,222,067 | 9/1980 | Stern et al. | 380/7 |
| 4,434,436 | 2/1984 | Kleykamp et al. | 380/7 |
| 4,450,481 | 5/1984 | Dickinson | 358/118 |
| 4,521,809 | 6/1985 | Bingham et al. | 358/118 |

Primary Examiner—Stephen C. Buczinski
Assistant Examiner—Linda J. Wallace
Attorney, Agent, or Firm—Sughrue, Mion, Zinn, Macpeak & Seas

[57] ABSTRACT

A selective viewing control system for controlling viewing access to designated channels in a CATV system. A CATV control center sends to viewing control units a digital signal indicating which channels are to be jammed. In response, the viewing control unit produces a jamming signal, added with the unjammed television signal, containing frequency bursts at timed intervals. Each frequency burst corresponds to a single channel to be jammed. A digitally controlled phase-locked loop circuit is employed to generate the jamming signal.

7 Claims, 3 Drawing Sheets

SELECTIVE VIEWING CONTROL SYSTEM FOR CATV

This is a continuation of application Ser. No. 736,058, filed May 20, 1985, now abandoned.

BACKGROUND OF THE INVENTION

The present invention relates to a system for selectively inhibiting the viewing by unauthorized subscribers of designated channels in a CATV system. More particularly, the invention pertains to such a system which is usable in CATV systems employing different transmission techniques.

In most CATV systems, certain channels are designated as "pay" channels for which the subscriber must pay a special fee to be able to watch. Thus, if a subscriber is not authorized to view a particular channel, the CATV system must be provided with a viewing control system having the capability of inhibiting viewing of that channel.

Conventionally, several different viewing control systems have been known, each employing a different technique to achieve the channel inhibiting function.

In one system, known as the jamming system, a carrier having a level about the same or greater than the level of the video carrier level and at a frequency about 2.5 MHz above the center frequency of the video carrier is injected at the CATV control center into the video band of each "pay" channel. For each authorized subscriber, a notch filter is provided for each channel to be unjammed to remove the carrier. This system, however, suffers from the drawback that one filter must be provided for each unjammed channel for each subscriber. Also, the filter must have excellent characteristics since, for instance, if the center frequency of the filter is even slightly different than the frequency of the jamming carrier, a beat will occur in the viewed picture. Thus, the filters are unavoidably expensive.

In another conventional system, known as the trap system, traps to block unauthorized reception are provided at the tap-off point to the subscriber's terminal. The disadvantages of this system are that the traps must be located in a difficult to access area, usually up a utility pole. Besides being difficult to install, the traps take up a great deal of space, which is usually at a premium at the location at which the traps must be installed. Moreover, if a large number of traps are employed in the tap circuit of a subscriber, the overall quality of the subscriber's reception is degraded.

In a further conventional system, known as the addressable terminal system, a digital signal is transmitted from the CATV control center to a terminal unit in each subscriber's home or office, the digital signal indicating which channels are authorized to be viewed. In the subscriber's terminal unit, the digital signal is decoded and unauthorized channels are jammed. This system though is disadvantageous in that a costly terminal unit must be provided each television set connected to the system, even if many different televisions are connected at a single subscriber's location. Also, it is possible for a subscriber to alter the terminal unit to receive unauthorized channels without paying the required fee. Moreover, access to the subscriber's premises must be had to service the terminal unit.

SUMMARY OF THE INVENTION

Accordingly, it is an object of the present invention to provide a viewing control system for a CATV system in which the above-mentioned problems have been eliminated.

In accordance with this and other objects, the invention provides a viewing control system comprising a plurality of viewing control devices, one for each subscriber located at the tap-off point from the main cable to the subscriber's home, office, etc. Each viewing control device contains a digitally controlled oscillator circuit driven to produce, in time sequence, jamming carrier signals in the video band of each of the channels to be jammed. The jamming control signals are added to the signal sent to the subscriber's television set or sets. A digital signal for instructing which channels are unauthorized is transmitted to each viewing control device from the CATV control center. The digitally controlled oscillator circuit is preferably implemented with a voltage-controlled oscillator circuit connected in a digitally controlled phase-locked loop circuit. The output of the phase-locked loop circuit is mixed with the output of a local oscillator, the oscillation frequency of which is set in accordance with the particular transmission system in use.

DESCRIPTION OF THE PREFERRED EMBODIMENTS

Figure 1:
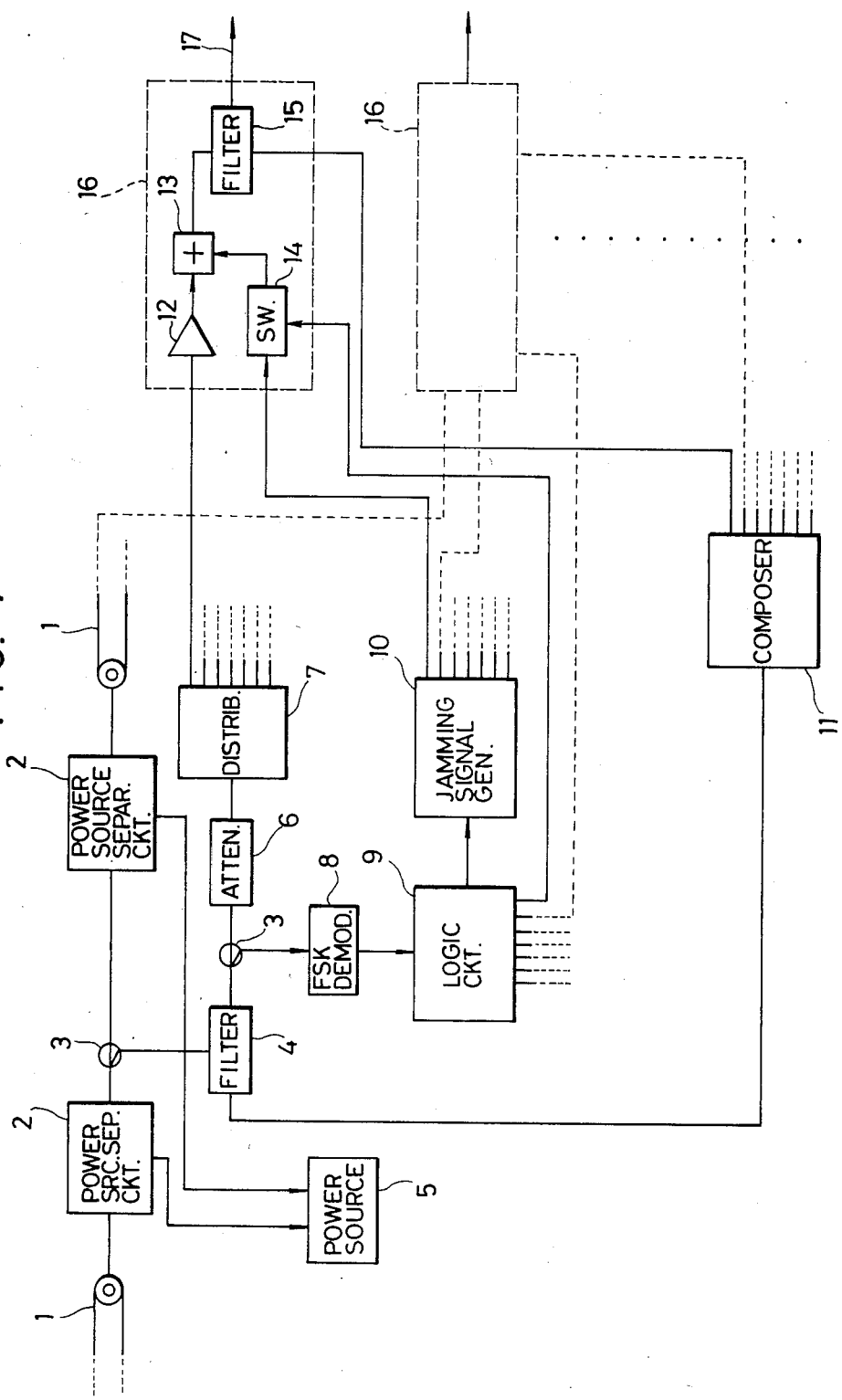
FIG. 1 is a block diagram of a portion of a CATV system in which the viewing control system of the invention is employed.

Referring now to FIG. 1, there is shown therein a portion of a CATV system employing a viewing control system of the invention. The CATV system has a branch cable 1 feeding signals from a CATV control center via a main cable and the like. The signals sent from the CATV control center include unjammed video and audio signals for all channels carried by the system and digital signals for instructing which channels are unauthorized for which subscribers. The digital signals may be FSK (Frequency-Shift Keyed) signals using a technique commonly employed in the known addressable terminal systems. A DC voltage is also imposed on the branch line to provide operating power for the various viewing control devices and other components.

At the tap-off point for a particular subscriber, a power source separating circuit 2 is employed to provide operating power. The output of the power source separating circuit 2 is filtered and regulated by a power source circuit 5 for use in the various circuits of the viewing control device and other circuits.

The video and digital signals pass from the branch line 1 via a tap 3 to a filter 4, the outputs of which are applied to a composer 11 and a second tap 3. One output of the tap 3 is applied through an attenuator to a distributor 7, while the other output of the tap 3 is applied to an FSK demodulator employed to demodulate the digital signal transmitted from the CATV control center to the viewing control device.

This much of the system illustrated in FIG. 1 is known conventionally, and is used, for instance, in the above-mentioned addressable terminal system.

A logic circuit 9 receives the output of the FSK demodulator 8, the output of the FSK demodulator being in the form of a set of digital numbers identifying channels to be jammed. In response to these numbers, the logic circuit 9 produces a repeating time sequence of numbers indicative of which channels are to be jammed. For this purpose, the logic circuit 9 can be implemented with a microprocessor or, for example, as a memory storing the values received from the FSK demodulator and a counter for repetitively reading out the contents of the memory in sequence. The output of the logic circuit 9 is applied as a PLL (Phase-Locked Loop) control signal to a jamming signal generator 10, the details of which are shown in FIG. 2.

Basically, the jamming signal generator produces, in time sequence, jamming signals falling in the video band of each of the channels to be jammed. The output of the jamming signal generator is applied through a switch 14 in a module 16 to one input of a signal adder, the other input of which is the unjammed television signal outputted by the distributor 7, boosted if necessary by a broadband RF amplifier 12. The output of the signal adder is applied through a filter 17 to the drop line 17 to the subscriber's television set or sets.

The reason for the provision of the switch 14 is that it is of course impossible for any practical digitally controlled oscillator circuit to switch output frequency instantaneously. Therefore, the switch 14 is turned off by the logic circuit 8 for a guard-band period of time around the times at which the output frequency from the jamming signal generator is being changed to protect against interference.

Figure 2:
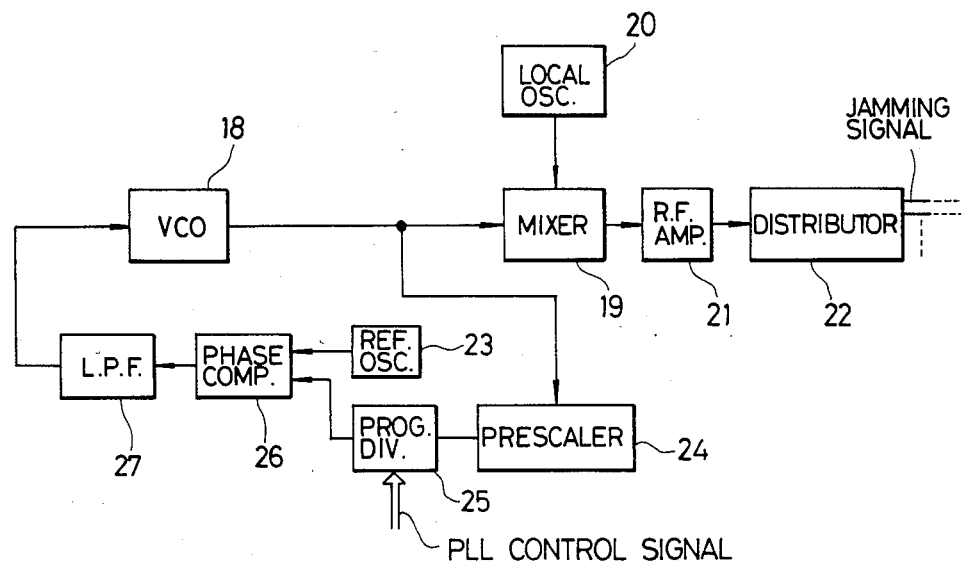
FIG. 2 is a block diagram of a jamming signal generator circuit employed in the viewing control system of FIG. 1.

The jamming signal generator is constructed as shown in FIG. 2. The PLL control signal from the logic circuit 9 is applied as a digital control signal to a programmable divider 25. The output of the programmable divider 25 is phase-compared with the output of a reference oscillator 23 by a phase comparator 26, the output of which is applied through a low-pass filter 27 to the control input of a voltage-controlled oscillator. The output of the voltage-controlled oscillator is applied to the input of the programmable divider 25 through a prescaler circuit 24. These components form a phase-locked loop circuit.

The output of the voltage-controlled oscillator is applied to one input of a mixer 19, the other input of which receives the output of a local oscillator 20. The output frequency of the local oscillator is set in accordance with the transmission system employed in the particular CATV system, as will be explained in more detail below. The output of the mixer is amplified by an RF amplifier before being applied through a distributor as the jamming signal.

Figure 3:
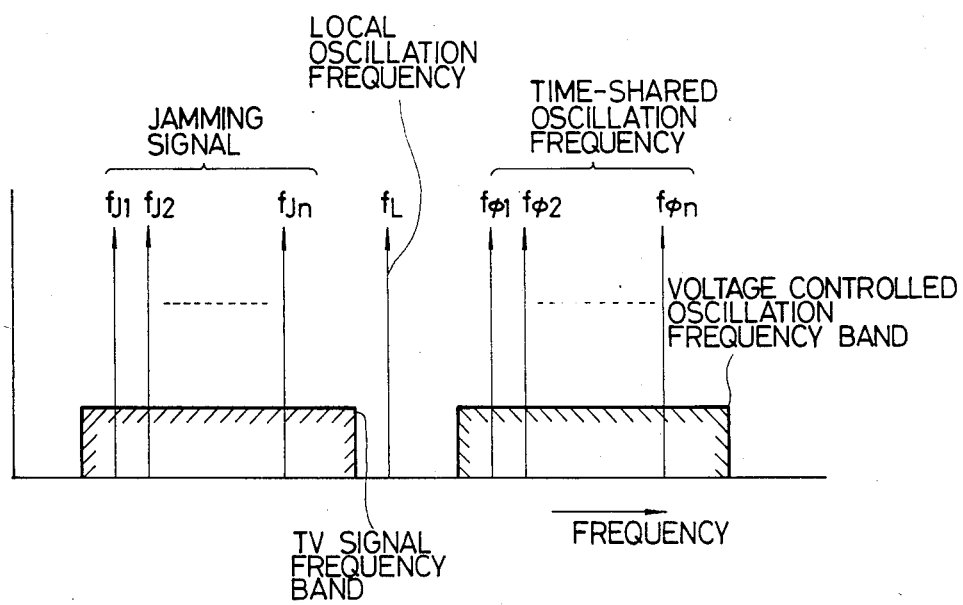
FIG. 3 is a diagram showing a frequency distribution of video and jamming signals employed in the viewing control system of FIG. 2.

The operation of the circuit of FIG. 2 will be explained with reference to FIG. 4. Each time a switching pulse is received, a different PLL control signal value is received, and hence the output of the phase-locked loop circuit changes. The changes occur in steps (waveform Vt), each step corresponding to a different channel to be jammed. The output of the phase-blocked loop circuit is thus a sequence of bursts, assumed here to be at frequencies $f\phi 1$, $F\phi 2$, ..., $f\phi n$, as shown in FIG. 3. Mixed with the output of the local oscillator 20 at a frequency fl, bursts at frequencies fj0, fj1, ..., fjn are produced, which act as the jamming signal.

By the use of the local oscillator 20, the time-shared oscillation frequencies $f\phi 1$, $f\phi 2$, ..., $f\phi n$ in the frequency band of the voltage controlled oscillator are shifted down to the jamming signal frequencies fj1, fj2, ..., fjn in the TV signal frequency band.

Figure 4:
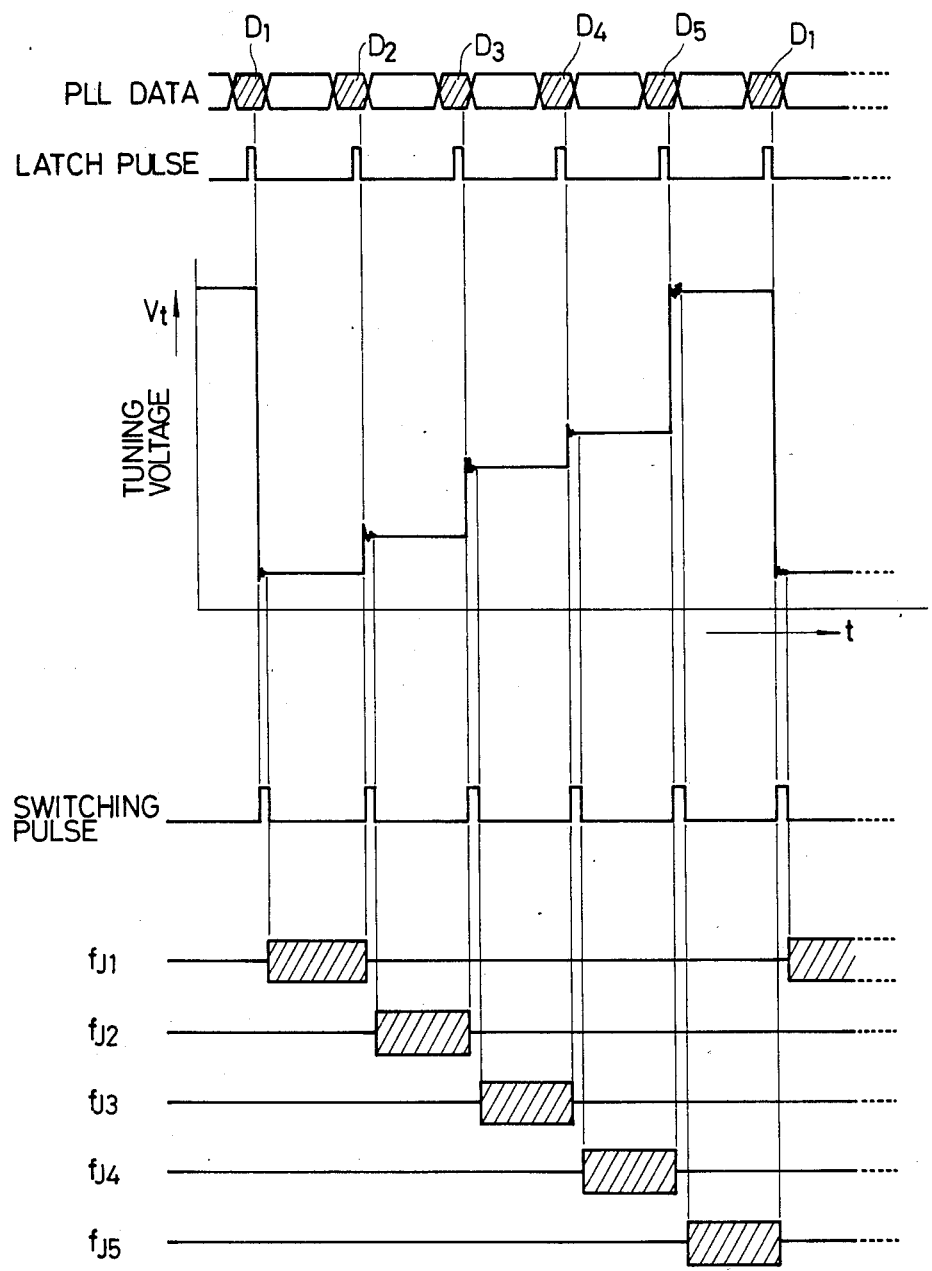
FIG. 4 is a waveform diagram used to explain the operation of the viewing control system of the invention.

The intervals D1, etc., indicated in FIG. 4 correspond to the intervals where the switch 14 is turned off to prevent interference.

By proper choice of the output frequency of the local oscillator 20, the frequency interval of the bursts fj0, ..., fjn can be made equal to the channel spacing, namely, 6 MHz as is standard in the United States. More particularly, as mentioned above, there are different transmission systems currently in use. One of these employs as transmission frequencies the ordinary over-the-air frequencies, while another employs a constant 6 MHz channel spacing throughout the transmission band. If the local oscillator were not set in accordance with the transmission system at hand, it would be necessary to use a frequency interval of about 250 kHz. This would greatly complicate the circuit construction since it is very difficult to switch the output frequency of a phase-locked loop circuit at the rate required in such a case. However, by proper choice of the output frequency of the local oscillator, this difficulty is avoided and a 6 MHz frequency interval can be employed.

This completes the description of the preferred embodiments. Although preferred embodiments have been described, it is believed that numerous modifications and alterations thereto would be apparent to one of ordinary skill in the art without departing from the spirit and scope of the invention.

I claim:

1. A CATV system having a central control center and a plurality of terminal units located at tap-off points for individual subscribers and coupled to said central control center via a signal distribution network, each of said terminal units comprising a selective viewing control system comprising:

controlled oscillator means operating in response to digital values transmitted from said central control center over said signal distribution network indicating channels to be jammed for producing a jamming signal containing only a repeating sequence of signal bursts at frequencies determined by said digital values and falling within respective channels to be jammed; and means for adding said jamming signal to a television signal received from said central control center via said signal distribution network, a resulting sum signal being provided as an input signal to a respective subscriber's television set.

2. The CATV system of claim 1, further comprising: local oscillator;

a mixer for mixing an output of said local oscillator with an output of said controlled oscillator means; and means for adding an output of said mixer with an unjammed television signal.

3. The CATV system of claim 2, further comprising switch means inserted in a signal path of said output of said mixer for inhibiting addition of said output of said mixer with said unjammed television signal during frequency transient times of said output of said mixer.

4. The CATV system of claim 3, wherein an output frequency of said local oscillator is set in accordance with a type of transmission system employed by said CATV system.

5. The CATV system of claim 4, wherein a frequency difference between ones of said bursts for jamming adjacent channels is equal to a frequency difference between said channels.

6. The CATV system of claim 5, wherein said controlled oscillator means comprises a phase-locked loop circuit.

7. The CATV system of claim 6, wherein said phase-locked loop circuit comprises: a voltage-controlled oscillator; a prescaler receiving as an input an output of said voltage-controlled oscillator; a programmable divider receiving as a signal input an output of said prescaler and as a digital control input said sequence of digital values; a reference oscillator; a phase comparator receiving as inputs outputs of said programmable divider and said reference oscillator; and a low-pass filter receiving as an input an output of said phase comparator, an output of said low-pass filter being applied to a control input of said voltage-controlled oscillator.

* * * * *